Dec. 18, 1934. J. P. SHERMAN 1,984,814
COMPOSITE MATERIAL
Filed Sept. 5, 1933
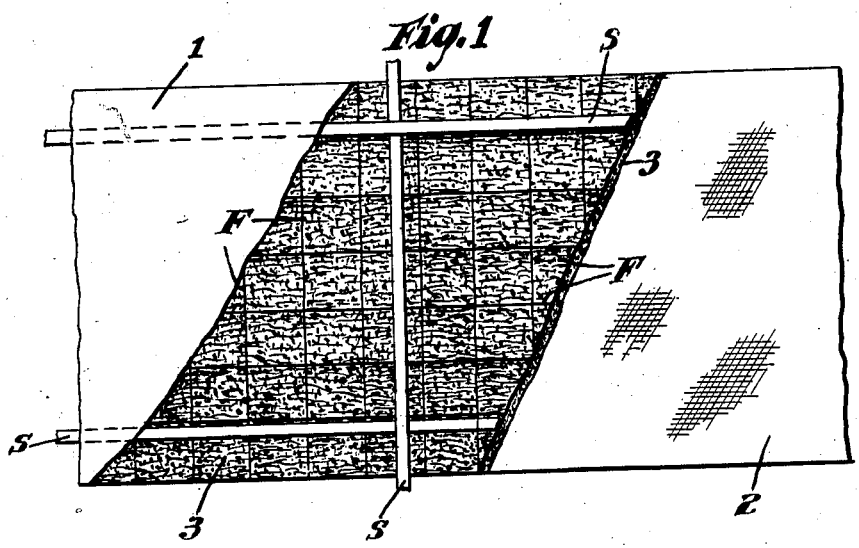
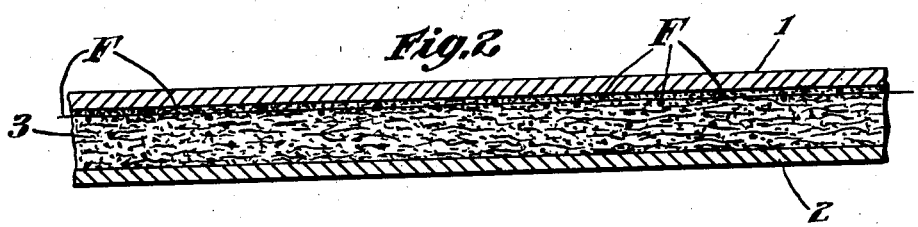
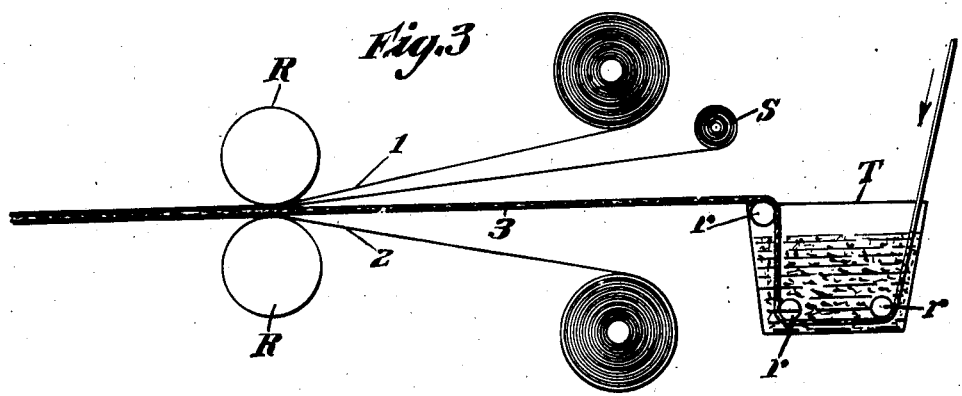
Inventor
John P. Sherman
By Otis Spratt Jr.
Attorney Patented Dec. 18, 1934

1,984,814

UNITED STATES PATENT OFFICE 1,984,814

COMPOSITE MATERIAL

John P. Sherman, Gorham, Maine

Application September 5, 1933, Serial No. 688,156

6 Claims. (Cl. 154—50)

My invention relates to composite materials composed of two external sheets confining between them a reenforcing material such as thread, yarn, cheese-cloth or natural fibre, said material being so confined by application of an adhesive, such as asphalt or the like.

Such materials are very old in theory and practice and are highly desirable and important for a variety of purposes, notably for tarpaulins, liners for excavations, coverings, roofings or other building material, or for containers or other fabricated articles where waterproofness, strength, flexibility and corresponding characteristics are desired.

In fabricating such composite materials heretofore, great difficulty has been found in combining with the external sheets such internal reenforcement without weakening the completed composite by the action of the reenforcing material itself which, under the pressure required to cement the composite together, has invariably forced itself into and in some instances through the thin superficial surfacing sheets. Moreover, such superficial sheets are commonly of a relatively dense paper which cannot, by reason of its dense formation and its contained sizing material absorb a sufficiency of the asphalt.

It has therefore been the usual practice to cement the two external sheets together with an adhesive which, though incapable of permeating the sheets themselves, nevertheless interposed of itself a more or less water-resisting membrane, said membrane being, however, injured by the presence of the reenforcing strands or fabric and forced mostly away from the papers along all lines whereon such reenforcing material occurs; while said reenforcing material is itself forced into the external sheets, thus impairing the structure in strength, appearance and that smoothness and integrity of external area desired as for shedding water.

Moreover in the application of adhesives, more especially of asphalt, it has not been heretofore feasible to form internally of the composite structure a water-resistant membrane of substantial thickness in itself since asphalt, in common with other adhesives, serves best as a bonding agent when used in relatively thin films even though such thinness of film militates against waterproofness.

However, I have discovered that I may combine with the external sheets an internal ply of porous fibrous character (hereinafter called the "ply") capable by reason of its absorbency of receiving large amounts of molten or emulsified asphalt. When I provide this absorbent middle ply of fibre, highly impregnated, apply thereto such reenforcing materials as I wish and force against this impregnated and reenforced ply two external sheets as of paper, I produce a composite material smooth upon its exposed surfaces, rendered extremely resistant to water by its high content of asphalt and in which the reenforcing materials are completely embedded and concealed in the middle ply.

Moreover, by such means, I am able to furnish a material possessing ample flexibility since the porous middle ply with its contained asphalt remains itself flexible and cannot render the composite material brittle.

Again such a porous middle ply, while acting as a soft, resilient bed for the fibrous element, at the same time serves as a reticulum into which the asphalt will fully and uniformly flow.

By reason of the herein-described characteristics of this central ply, I am enabled to introduce into it a relatively large amount of impregnant. In fact I have been enabled to introduce into such ply five times its weight of asphalt while maintaining its flexibility. Because of the large amount of asphalt that I can introduce, the ply is effectually waterproofed. As a result of my invention this abnormally large percentage of asphalt is so effectively entrapped by the fibres of the ply that extreme pressure may be applied to consolidate the composite material, without extrusion of asphalt upon either the machinery in which the material is made or upon the finished product itself.

I find that the factor of high compacting pressure is important in that the fibres must be forced into such intimate association with the asphalt as to provide a ply inherently tough and resistant to fracture in itself, while having exceptional waterproofness because of its large content of asphalt.

In fact my ply, so composed, has after immersion for twenty-four hours in water absorbed only one-half of one percent of its own weight of water. This may be compared with the absorption of 40% of water by other products for the same purpose now being made.

I realize that an equal waterproofness may be effected by the application of a similar ply to the outside of a composite structure. However, when a ply of my characteristics is used as an outer face of such structure these very characteristics militate against its utility in that such a large load of asphalt is objectionable upon an exposed surface. Greater utility inheres in my material since it exposes a surface of, e. g., smooth, unsaturated paper capable of being painted or otherwise decorated, and having no visible asphalt to interfere with such treatment or with handling, rolling-up, placement upon work or the like.

Although such external sheets as I use are not in themselves water-resistant, the composite structure is exceptionally waterproof by reason of its internally-contained asphalt, and although the external surfacing sheet may in time disintegrate unless protected, there still remains an impervious barrier to water.

I find it preferable to use as my central ply a material the density of which, on a scale to be hereinafter explained, is as low as cost factors permit. However, I can accomplish the purpose of my invention with a ply of which the material is of low cost, and which has a density of about sixty. If I resort to densities much lower than that the cost of making such low-density material puts limits upon the utilization of my invention which need not exist, since I get the results desired with the stated density. The material that suffices to meet my requirements may be made of low-cost fibres on any pulp or paper making machine and requires only that no undue pressure be put upon the wet pulp while material for my ply is being formed. A ply to meet the usual requirements of products made in accord with this invention need have a weight-basis of only from 30 to 60 pounds per ream (a ream being taken to consist of 480 sheets each 24 inches by 36 inches in area).

In fact, for a product to be made under my invention and of lowest attainable cost, I find I may use as my material for the ply an unsized sheet of paper formed from low-grade fibres and having a weight-basis of from 30 to 50 pounds, which I crinkle, emboss, or crepe to give it an artificial bulkiness sufficient to absorb and superficially carry a total amount of asphalt adequate to my needs, and still provide, with such low-cost construction, for the complete embedment of any reenforcing strands or fabrics used.

Heretofore, makers of reenforced papers or the like using yarns or fibrous materials for reenforcement, have been forced to make use of a fibre or filament having practically no stretch because the papers, having no great amount of stretch in themselves, called of necessity for a reenforcing element having an even smaller amount of stretchability. Of course this had to be so, for otherwise no reenforcement would be imparted to the structure by the fibres or filaments. For failure to recognize such requirements many existing materials have proved unsatisfactory, as can readily be seen, because a relatively unstretchable paper will tear away from a stretchable reenforcement before the fibres of such reenforcement can act to prevent rupture.

By my present methods, a manufacturer is not limited to the use of relatively non-stretching fibres or cords in his material because my soft central ply will stretch and will not rupture before the reenforcements have a chance to take up the strain even through the surfacing sheet may crack.

This ability to use yielding reenforcements combined with a yielding protective central ply allows the use of reenforcing elements consisting of hemp, jute, ramie, cotton or other fibre whether used as such or as developed into textile yarns or fabrics.

As my invention can only be carried out effectively when due regard is had to the most suitable weights and densities of the ply, I prefer as stated above to use a pulp ply of a weight basis of from 30 to 60 pounds, but to carry out this invention successfully it is imperative, even so, that the ply be formed of suitable "density".

The density of a sheet of compacted pulp or of paper is defined by common consent as its weight basis divided by 100 times the caliper of a single sheet in inches.

Thus, when I use a 60 pound weight-basis ply, I cause it to be so formed (as by control of paper-making-machine pressures) as to caliper 0.02 inch if of 30 density or to caliper 0.01 inch if of 60 density.

Densities of or between these stated amounts are best suited to my needs when I use a ply of paper-making pulp, although a 100 pound weight-basis pulp will give optimum results in most cases if it falls within the above-stated range of densities.

As is well known, the stoutness of a sheet of paper comes from the felting and bonding of its constituent fibres while these are saturated with water as in normal paper-making pulp. Hence I prefer to use such so-called "wet-laid" plies developed by normal paper-making methods to a stout formation, dry these, impregnate them and so use them. For the sake of utmost cheapness of product I may use the masticated mixture in the manner stated in place of a wet-laid ply; but in such case I can in no way give to my ply the stoutness of the wet-laid web.

For the purposes of disclosure and discussion herein I have selected as an illustrative type of product a double-faced paper-surfaced sheet having between its inner faces and adherently bonded thereto what is in effect an impregnated ply of fibres. This illustrative type is shown in the accompanying drawing as follows:

Fig. 1 is a view of a section of a sheet of my material the top cover being broken away to show the impregnated ply and that in turn broken away to show the bottom cover sheet.

Fig. 2 is a section through a sheet, and

Fig. 3 is a diagram of the assembling apparatus.

On the basis of the material shown in the drawing, I provide a pair of exterior cover sheets 1 and 2. These may be identical or of different nature. For example, sheet 1 might be paper of one kind or stock such as of so-called kraft type. Sheet 2 might be of different stock such as for instance common "news"-print stock when intended only for a liner and/or itself waterproofed or otherwise treated or processed, or it may consist of a woven sheet of textile material.

Between these as a waterproof and/or strengthening element I introduce an asphalt or other binder preferably thermoplastic. This is according to my invention mixed or absorbed as an impregnant in a fibrous ply 3.

As shown in Fig. 3 it may be drawn from a roll through a tank T, guided by rolls r. Strips 1 and 2 may also be drawn from rolls through the bite of compressor rolls R. These rolls may be heated to set and cement the binder in firm union with the sheets 1 and 2. Such a waterproof impregnation may be made in accord with my invention to exclude water to one-half of one percent absorption in 24 hours.

Longitudinal and transverse threads, yarns or fibres F may be drawn in or run in between the sheets 1 and 2. They readily become embedded in or with the ply 3 and may be made to give any strength desired. So embedded the fibres F enter the surface of the ply 3 and are there anchored and enclosed so that they do not cut or crease the cover sheets.

The impregnated ply 3 provides an extended depth or thickness of the asphaltic or other bonding and waterproofing material.

In the manufacture of tarpaulins it often becomes necessary to stitch one or more sheets of the material together along their margins. Paper, however, will not hold stitching well and tears along the line of stitching. In my present product I propose to introduce a plurality of suitable strips of fabric S or the like which shall be placed at predetermined intervals along the sheet at points where stitching will occur. The tape S will be of a suitable width to receive the row of stitching and crosswise tapes of like material and width may also be introduced into the structure if transverse as well as longitudinal stitching is necessary. The tapes may or may not be impregnated previously with latex, asphalt or other substances to add to their strength and adhesiveness for the purpose of being the better bonded to my material.

These strips will supplement the reenforcing strands 3 and will serve as localized areas of great strength and tear-resistance at critical points where stitching will occur.

The tape may be laid between the covers as the several elements of the product are assembled and may later be bonded in place by pressure. If transverse tapes are to be used these may be positioned before the top sheet is added. As the surface sheets may be paper my product can be handled in machines like ordinary stock without leaving sticky or gummy surfaces. I am aware that papers have been plied together in three or more plies and cemented, but so far as I know my present results have never been reached by such means.

No normally dense paper is capable of absorbing enough asphalt or the like to make it sufficiently watertight, and the mere plying up of many layers fails of my result. It is only when one or more inner layers are of soft absorbent character, fully impregnated with asphalt or the like and then compacted against surfacing sheets as of normally dense paper that I can carry out my purpose of making a material stout, watertight and containing within it the desired reenforcing strands suitably sunk within the soft absorbent material.

After assembling my materials I subject the assembly to pressures up to thirty or more tons per square foot. If only dense papers, mill boards or the like are used, such pressures merely cause the strands to score and cut the papers and the product will lack the qualities of watertightness, flexibility and great stoutness which I obtain in mine. Having found that only material of low density will serve my needs for the embedment of the strands and for waterproofness, I recognize the structural weakness of such soft absorbent material and overcome that by applying the pressure stated, whereupon the same soft ply which was originally weak now acquires for itself a great strength and does not for all uses require any reenforcement as by strands.

Less obviously, but as a result of my work, it may be stated that such high pressure is of less advantage when I substitute for my wet-laid ply of soft pulp material with its absorbed asphalt a thermoplastic mix of fibre and asphalt, since the mix is viscous and becomes displaced and the strands disturbed by undue pressure applied vertically to the surface of my material, whereas the wet-laid soft ply is not viscous and does not flow out laterally at however great a pressure I may apply but becomes firmly compacted and takes on the quality of stoutness against tearing to a very high degree.

The objects of my invention may be attained by such variants of these disclosures as are obvious without departing from the spirit of my invention.

What I therefore claim and desire to secure by Letters Patent is:—

1. In a laminated sheet for a pliant waterproof building or like material, an internal ply of highly porous uncompacted paper-making pulp saturated with molten asphalt and having embedded in it spaced reenforcing strands substantially as described.

2. A fibrous sheet for a pliant waterproof building or like material composed of two external surfacing sheets, an asphalt soaked internal ply and spaced reenforcing strands embedded in said ply, said internal ply being an uncompacted highly porous web performed from paper-making pulp and impregnated with asphalt, said asphalt being present in an amount by weight at least twice the weight of said preformed web, and the composite structure being consolidated by pressure.

3. A fibrous sheet for a pliant waterproof building or like material composed of two external surfacing sheets, an asphalt-soaked internal ply and spaced reenforcing strands interposed between said ply and at least one of the surfacing sheets, said internal ply consisting of a preformed highly porous web of paper-making pulp saturated with molten asphalt weighing at least twice the weight of said ply, said reenforcing strands being positioned within the yieldable mass of said ply by pressure, and the composite material being consolidated by pressure into a unitary structure.

4. A composite sheet of pliant waterproof character composed of surfacing sheets, a highly absorbent asphalt-saturated preformed ply of paper-making pulp intermediate said surfacing sheets and spaced reenforcing strands positioned upon and forced into the substance of said ply.

5. A fibrous sheet building material composed of two external surfacing sheets, an asphalt-saturated internal ply, spaced reenforcing strands embedded in said ply, said internal ply being an initially lightly-compacted highly porous web preformed from paper-making pulp and impregnated with asphalt weighing at least twice the weight of the said web.

6. In a composite sheet building material, surfacing sheets, an internal ply of highly porous preformed and uncompacted paper-making pulp, said ply being saturated with at least twice its weight of molten asphalt, said ply furthermore having embedded within at least one of its faces spaced reenforcing strands, and said ply carrying reenforcing tapes at predetermined points, and cementitiously adhered to said ply and to said surfacing sheets.

JOHN P. SHERMAN.